Dec. 27, 1960  E. R. ZIEGLER  2,965,913
WINDSHIELD CLEANING SYSTEM
Filed Dec. 26, 1957  2 Sheets-Sheet 1
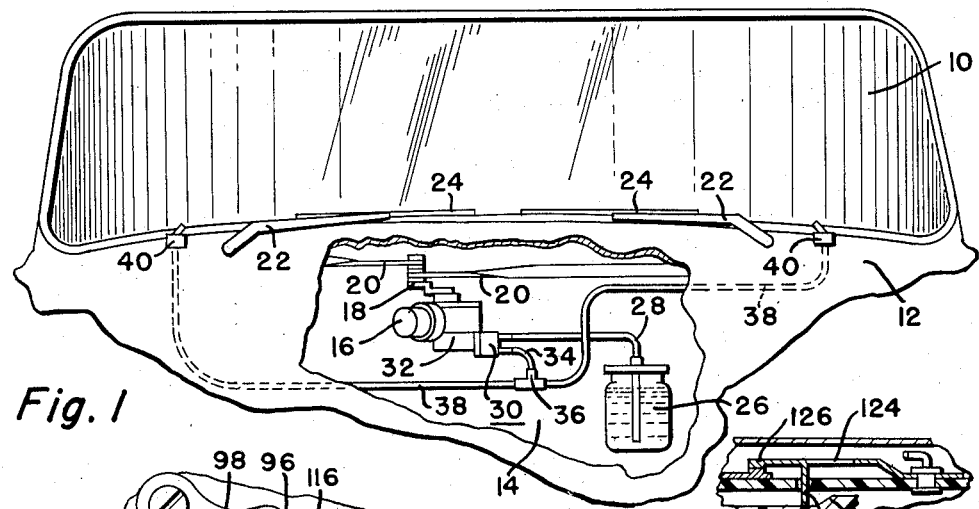
Fig. 1
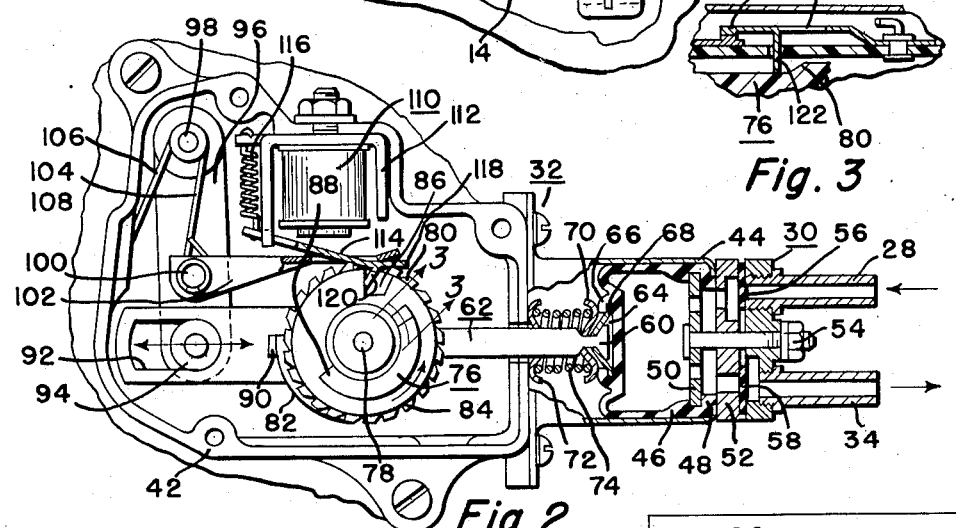
Fig. 2
Fig. 3
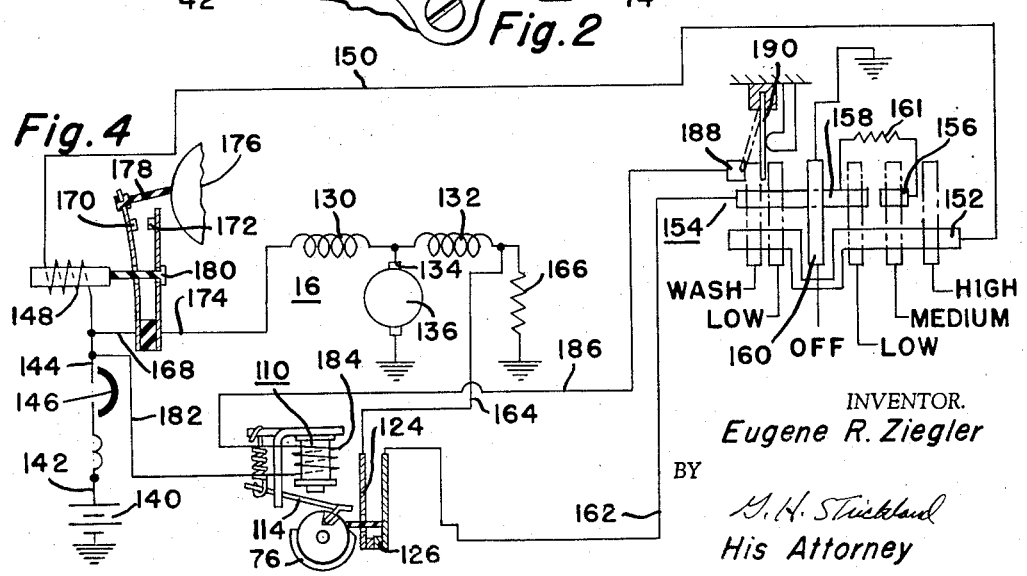
Fig. 4
INVENTOR.
Eugene R. Ziegler
BY
G. H. Strickland
His Attorney Dec. 27, 1960  E. R. ZIEGLER  2,965,913
WINDSHIELD CLEANING SYSTEM
Filed Dec. 26, 1957  2 Sheets-Sheet 2
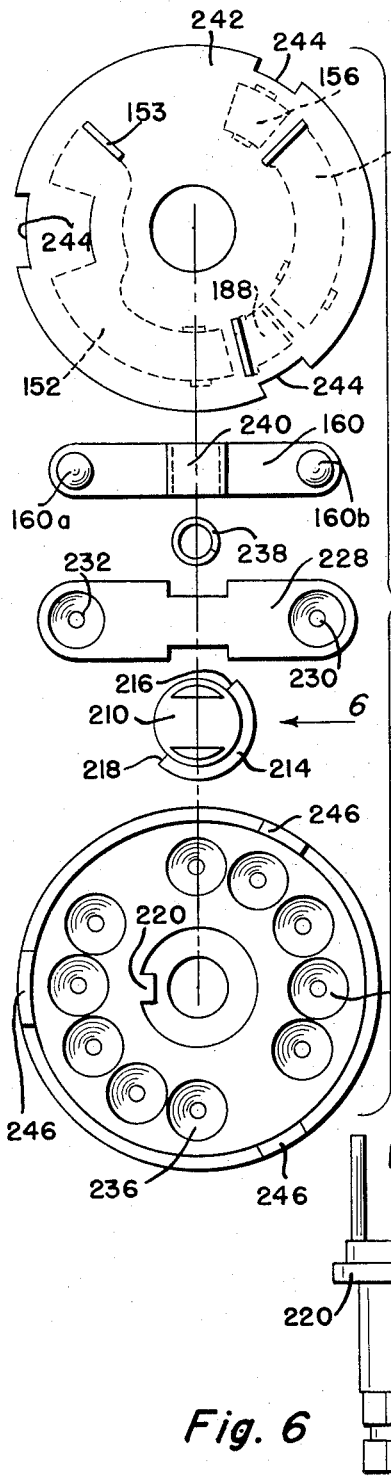
Fig. 5
Fig. 6
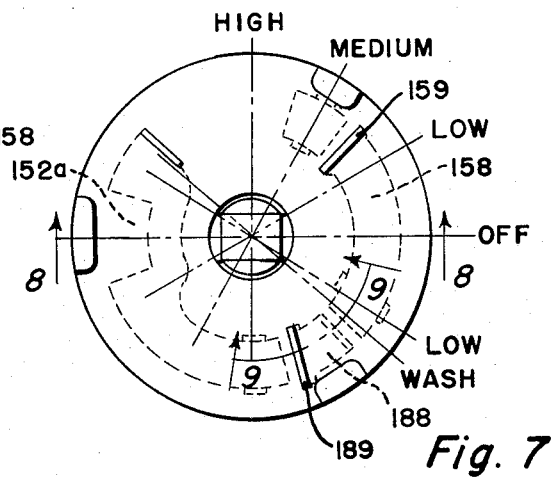
Fig. 7
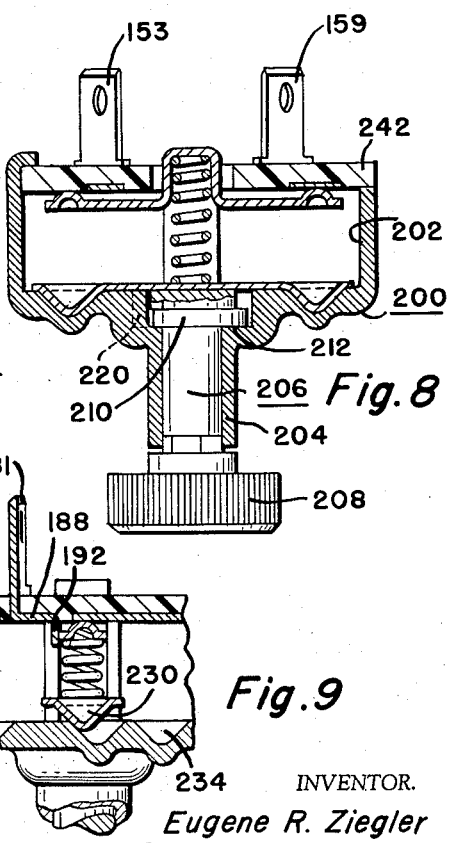
Fig. 8
Fig. 9
INVENTOR.
Eugene R. Ziegler
BY
A. H. Strickland
His Attorney United States Patent Office 2,965,913
Patented Dec. 27, 1960

2,965,913

WINDSHIELD CLEANING SYSTEM

Eugene R. Ziegler, Spencerport, N.Y., assignor to General Motors Corporation, Detroit, Mich., a corporation of Delaware Filed Dec. 26, 1957, Ser. No. 705,199

19 Claims. (Cl. 15—250.02)

This invention pertains to the art of windshield cleaning, and particularly to a system wherein solvent is sprayed onto a windshield conjointly with movement of a windshield wiper blade thereacross to clean the windshield.

In my prior application, Serial No. 634,867, filed January 18, 1957, now Patent #2,878,505, a windshield cleaning system comprising an electric motor for actuating windshield wipers and a washer pump is disclosed. In this system, upon closure of the washer control switch, the electric motor is energized so as to effect conjoint operation of the washer and wipers; the washer pump discharges intermittent squirts of liquid solvent onto the windshield for a predetermined number of wiper strokes during the conjoint operation and is thereafter automatically stopped; and the wipers continue to operate for a predetermined number of strokes constituting a drying cycle, after which the wipers are automatically arrested by deenergization of the electric motor. In this type of system it has been found that the feature of automatically arresting the wipers does not always produce the desired result of cleaning the windshield, particularly where the windshield is of a compound curvature, that is, curved about both the vertical and horizontal axes. In compound curved windshields of this type, the liquid solvent may cling to the windshield above the path traversed by the wipers, due to the hump in the windshield caused by curvature about the horizontal axis, and after the wipers have been automatically arrested, this liquid solvent runs down the windshield to streak the same thereby rendering it necessary for the operator to again turn on the windshield wipers for clear vision.

The present invention relates to an improved cleaning system wherein the number of wiper strokes during which the washer is operative is automatically predetermined, but wherein the number of wiper strokes for drying the windshield is manually controlled, or determined, by the operator.

Accordingly, among my objects are the provision of a washer pump driven by an electric motor, or other rotary means, having an automatically predetermined period of operation; the further provision of a washer pump driven by a wiper motor which is operative for a predetermined number of wiper strokes and is thereafter automatically arrested; the further provision of an intermittent squirt type washer pump operated in timed relation with the oscillation, or stroking, of the wiper blades; the further provision of means for effecting conjoint operation of a washer unit and a wiper unit, the operation of the washer unit being predetermined and of definite duration whereas the operation of the wiper unit is manually determined by the operator; the further provision of an electrical controlled washer unit and an electrically controlled wiper unit together with a unitary switch assembly for effecting independent operation of the wiper unit for conjoint operation of the wiper unit and the washer unit; and the still further provision of a rotary switch assembly for controlling an electrically operated wiper unit and an electrically operated washer unit.

The aforementioned and other objects are accomplished in the present invention by embodying an interruptible driving connection between a wiper motor and a washer pump including a common actuator for establishing the driving connection between the wiper motor and the washer pump and energizing the wiper motor during conjoint operation of the washer unit and the wiper unit. Specifically, the wiper motor and the wiper actuating mechanism may be of the type shown in copending application Serial No. 686,432, filed September 26, 1957, in the name of Harry W. Schmitz and assigned to the assignee of this invention. Thus, the electric motor is of the unidirectional type and drives a crank assembly having a running orbit and a parking orbit. During operation of the crank assembly in the running orbit, the wiper blades are moved throughout a wiping stroke, the inboard limit of which is above the cowl of the vehicle. However, during operation of the crank assembly in the parking orbit the inboard stroke end limit is against the cowl of the vehicle, and during the operation in the parking orbit suitable parking switch means are actuated to deenergize the motor with the blades against the cowl in the depressed parked position.

The washer unit is of the general type shown in copending application S.N. 674,495, filed July 26, 1957, in the name of Harry W. Schmitz et al. and assigned to the assignee of this invention. Thus, the washer unit includes a pump comprising a flexible rubber, or rubber-like, bellows having a reciprocable rod attached thereto. The rod is urged in one direction by means of a compression spring, the compression spring tending to collapse the bellows and effect the delivery stroke thereof. The bellows communicates through suitable check valve means with a reservoir for liquid solvent and with conduits connected to washer nozzles having openings for discharging liquid solvent onto the outer surface of the vehicle windshield.

The worm gear driven by the electric motor has formed thereon an integral cam, which as depicted in this application has two lobes. However, it is to be understood that the number of lobes can be varied without departing from the spirit of this invention. Since a complete revolution of the worm gear results in movement of the wiper blades throughout a complete cycle, namely two strokes, the pump rod is operatively engageable with a follower engageable with the worm gear cam so that intermittent operation of the washer pump is timed with the stroke movement of the wiper blades. Thus, the lobes on the cam are arranged so that the pump effects an intake and a delivery stroke during both the inboard strokes of the blades and the outboard stroke of the blades. However, it is possible to utilize only a single cam lobe on the worm gear and arrange the cam lobe so that the delivery stroke of the pump occurs during either the outboard stroke or the inboard stroke.

The pump rod has an upstruck tang, or lug portion, engageable with a lock-out cam formed as an integral part of a ratchet cam assembly. The ratchet cam assembly is rotatably mounted on the pump housing for rotation in one direction, although it is restrained from rotating in the opposite direction. The pump rod has an elongate longitudinal slot within which one end of the cam follower is disposed. The cam follower is carried by a pivoted lever, the lever and cam follower being biased into engagement with the cam on the worm gear by a hairpin spring. A drive pawl for the ratchet cam assembly is also pivotally attached to the lever, the same hairpin spring biasing the pawl into engagement with the ratchet teeth on the ratchet cam assembly.

The control mechanism for the pump includes an electromagnet having an armature which normally constitutes a ramp upon which the pawl rides when the armature is deenergized, and the ratchet cam assembly is located in the "off" position. Upon energization of the electromagnet, the ramp is moved out of engagement with the ratchet cam assembly thereby establishing a driving connection between the pawl and the ratchet cam assembly. Under these conditions, the ratchet cam, constituting a timer is rotated in steps (timed with the stroking of the wiper unit), due to pivotal movement of the lever caused by rotation of the worm gear cam and reciprocation of the drive pawl.

The lock-out cam may extend through any desired arcuate extent, but as depicted in this application extends throughout an angle of substantially 180°. When the ratchet cam assembly is moved through a distance of one tooth from the "off" position, the pump rod lug is disengaged from the lock-out cam, and accordingly throughout rotation of the ratchet cam assembly for 180°, the pump is intermittently actuated. During the remaining 180° rotation of the ratchet cam assembly, the wiper motor continues to operate at high speed, and after one complete revolution of the cam the wiper motor continues to operate at low speed.

The unitary switch assembly for controlling the washer unit and the wiper unit comprises a rotary switch having six positions. From the "off" position, the switch can be rotated in the clockwise direction to "low," "medium" and "high" speed positions wherein the wiper motor is energized. When the switch is moved in the counterclockwise direction to the wash position, the washer electromagnet is energized as is the wiper motor. The switch need only be in the wash position momentarily, since as soon as the ratchet cam assembly moves throughout the distance of one tooth, the armature of the electromagnet is held out of the path of the driving pawl by the cylindrical periphery of a portion of the ratchet cam assembly. Moreover, when the switch is turned in the counterclockwise direction to the wash position, suitable switch detents are forced out of position so that upon release of the knob, the switch will automatically return to the low speed setting.

The ratchet cam assembly has a face cam which maintains the wiper motor energized for high speed operation during the complete revolution of the ratchet cam assembly. However, after one complete revolution of the ratchet cam assembly, the wiper motor continues to operate at low speed until the operator determines that the windshield is sufficiently dry to deenergize the wiper motor.

Further objects and advantages of the present invention will be apparent from the following description, reference being had to the accompanying drawings, wherein a preferred embodiment of the present invention is clearly shown.

In the drawings:

Figure 1 is a fragmentary view, partly in section and partly in elevation, of a vehicle equipped with the windshield cleaning mechanism of this invention.

Figure 2 is a fragmentary view, partly in section and partly in elevation, of the washer pump.

Figure 3 is a fragmentary sectional view taken along line 3—3 of Figure 2.

Figure 4 is an electrical schematic of the control system for the washer unit and the wiper unit.

Figure 5 is an exploded view in elevation of the components of the switch assembly.

Figure 6 is a view in elevation of the switch shaft.

Figure 7 is a rear view of the switch assembly.

Figure 8 is a sectional view taken along line 8—8 of Figure 7.

Figure 9 is a fragmentary sectional view taken along line 9—9 of Figure 7.

With particular reference to Figure 1, a vehicle is shown having a windshield 10, a cowl 12 and a firewall 14. The vehicle includes a wiper unit comprising a unidirectional electric motor 16 attached to the firewall 14 and which is drivingly connected to a crank assembly 18 having a running orbit and a parking orbit. The wiper unit may be of the type disclosed in copending application S.N. 686,432, and thus the crank assembly 18 is rotatably connected with the inner ends of connecting links 20, the outer ends of connecting links 20 being operatively connected to spaced pivot shafts, not shown, to which wiper arms 22 are drivingly connected. The wiper arms 22 carry wiper blades 24 which are movable over asymmetrical paths across the outer surface of the windshield.

The windshield cleaning mechanism also includes a washer unit comprising a liquid solvent reservoir 26 to which an intake hose 28 is connected, the intake hose communicating with a check valve assembly 30 associated with a washer pump 32. The check valve assembly 30 also connects with a discharge conduit 34 and a T-coupling 36. The T-coupling 36 connects with hoses 38 which are connected to nozzles 40 located so that liquid solvent is directed onto the windshield into the path of the wiper blades 24.

With reference to Figures 2 and 3, the washer pump 32 is of the general type shown in the aforementioned copending application S.N. 674,495, and thus comprises a pump housing 42 and a bellows housing 44 attached to the pump housing. The liquid displacing member of the pump comprises an elastomeric bulb, or bellows 46, disposed within the housing 44 and having an open end. A lip 48 surrounds the open end of the bulb, and is clamped between a perforated plate 50 and the check valve housing 52 of check valve assembly 30 by a bolt 54. The check valve assembly 30 includes a rubber element having a one-way flap type inlet check valve 56 and a one-way flap type outlet check valve 58. The closed end of the bellows 46 is connected to an enlarged end 60 of a reciprocable pump rod 62. More specifically, the closed end of the bulb 46 is formed with a depression 64 and an overhanging lip 66. The enlarged end 60 of the pump rod is disposed within the depression 64 and held therein by a spring washer. The other side of the lip 66 is embraced by a spring retainer 70 carried by the pump rod 62. A second spring retainer 72 circumscribes the pump rod 62 and engages the housing 42. A coiled compression spring 74 is interposed between two spring retainers, the spring 74 tending to collapse the bulb 46 so as to effect the delivery stroke thereof.

In accordance with the teachings of the aforementioned copending application S.N. 674,495, a ratchet cam assembly 76 is mounted on a stub shaft 78 in the housing 42 for rotation in the counterclockwise direction as viewed in Figure 2. The ratchet cam assembly includes a ratchet tooth portion 80, a lock-out cam portion 82 which extends throughout an angle of substantially 180°, a cylindrical portion 84 having a notch 86 and a face cam 88. The pump rod 62 has an upstruck tang, or lug, 90 engageable with the lock-out cam 82 when the ratchet cam assembly 76 is in the "off" position as depicted in Figure 2.

The pump rod 62 also has an elongated longitudinal slot 92 adjacent the end thereof and a second elongated slot, not shown, through which the stub shaft 78 projects, to facilitate reciprocable movement of the pump rod 62 relative to the ratchet cam assembly 76. One end of a cam follower 94 is disposed within the slot 92, the other end of the cam follower engaging an integral cam formed on a worm gear, not shown, driven by the electric motor 16. The follower 94 is carried by a lever 96 pivotally mounted by means of a pin 98 in the housing 42. The lever 96 carries a second pin 100 about which a drive pawl 102 is rotatably journalled. The lever 96 is biased in the counterclockwise direction as viewed in Figure 2 by a hairpin spring 104, one end 106 of which engages the housing 42, is wound about the pivot pin 98, and the other end 108 of which is wound about the pivot pin 100 and resiliently urges the drive pawl 102 into the engagement with the ratchet cam assembly 76.

During rotation of the worm gear, which rotates whenever the wiper motor 16 is energized, and is therefore rotating, the cam follower 94 will be reciprocated since the hairpin spring 104 resiliently maintains the follower 94 in engagement with the cam surface on the worm gear. Likewise, the drive pawl 102 carried by the ratchet 96 will be reciprocated. Reciprocation of both the drive pawl 102 and the cam follower 94 will not impart movement to the pump rod 62, or the ratchet cam assembly 76 with the parts located in the relative positions as depicted in Figure 2.

In other words, the pump rod 62 has an interruptible driving connection with the worm gear of the wiper motor, and the drive pawl 102 has an interruptible driving connection with the ratchet cam assembly. In order to establish the driving connections between the follower 94 and the pump rod 62, and the drive pawl 102 and the ratchet teeth 80, an electromagnet 110 must be mamentarily energized. The electromagnet is carried by the housing 42 and has a U-shaped frame 112 to which an armature 114 is pivotally mounted. The armature 114 is biased away from the core of the electromagnet 110 by a coil spring 116. The armature 114 has a ramp portion 118 and a follower portion 120. When the follower portion 120 is disposed in the slot 86, reciprocation of the drive pawl 102 does not effect step by step movement of the ratchet cam assembly 76, since the driving end of the pawl 102 rides upon the ramp 86 and does not engage the ratchet teeth 80. However, upon energization of the electromagnet 110, the armature 114 is moved into engagement with the core of the electromagnet, and in so doing it may lift the drive pawl 102. However, since the drive pawl reciprocates by reason of its being carried by the lever 96, the drive pawl will disengage itself from the armature 114, and continued reciprocation of the drive pawl will initiate step by step movement of the ratchet cam assembly 76 in the counterclockwise direction, as viewed in Figure 2.

As soon as the ratchet cam assembly 76 moves throughout a distance of one ratchet tooth in the counterclockwise direction, the lug 90 is disengaged from the lockout cam 82, and hence the drive connection between the pump rod and the follower 94 will be established. Thereafter, the pump will intermittently discharge liquid solvent onto the windshield for a predetermined number of strokes of the wiper unit, until the lug 90 reengages the lockout cam 82. When the pump is operative, the spring 74 is operative to collapse the bulb 46 at the dwell portion of the cam on the worm gear, and the follower 94 engages the left hand end of the slot 92 so as to positively expand the bellows 46 and effect the instake stroke when the follower engages the rise portion of the cam on the worm gear. Moreover, as soon as the ratchet cam assembly 76 has moved a distance of one tooth in the counterclockwise direction, the electromagnet 110 can be deenergized, since the follower portion 120 of the armature 114 engages the cylindrical portion 84 of the ratchet cam assembly, and thus is maintained in an inoperative position with respect to the drive pawl 102. At the end of a complete revolution of the ratchet cam assembly 76, the follower portion 120 of the armature 114 falls into the notch 86, thereby interrupting the driving connection between the pawl 102 and the ratchet teeth 80.

The ratchet cam assembly also has formed integrally therewith a face cam 88 constituting a switch actuator. As seen particularly in Figure 3, the face cam 88 is engaged by a follower 122 integral with a leaf spring contact 124. The leaf spring contact 124 is engageable with a stationary contact 126. The contact 124 engages the contact 126 when the follower 122 engages the face cam 88. The follower 122 engages the face cam 88 during the period when the pump rod lug 90 is disengaged from the lockout cam 82. Thus, when liquid is squirted onto the windshield, the contacts 126 and 124 are disengaged so that the wiper motor runs at high speed, as will be described hereinafter.

With reference to Figure 4, the electrical circuits for energizing the wiper motor 16 so as to effect operation of the wiper unit alone, or conjoint operation of the wiper unit and the washer unit, will be described. The wiper motor 16 is of the compound wound type and thus includes a series field winding 130, a shunt field winding 132, a brush 134 connected to the inner ends of the two field windings, an armature 136 and a brush 138 which is connected to ground. The motor 16 can be energized from a battery 140, one terminal of which is connected to ground and the other terminal of which is connected to a wire 142. The wire 142 is connected to a wire 144 through a thermal overload switch 146, or a fuse. The wire 144 is connected to a relay coil 148, the other side of the relay coil 148 being connected to a wire 150. The wire 150 is connected to a stationary switch contact 152 of a combined wiper unit control and washer unit control switch assembly 154. The switch assembly 154 also includes stationary contacts 156 and 158 and a movable bridging contact 160 which is connected to ground. Stationary switch contacts 156 and 158 are interconnected by a resistor 161, of, for example, twenty ohms. Stationary switch contact 158 is connected to a wire 162, the wire 162 being connected to switch contact 126. Switch contact 126 is engageable with a switch contact 124 which is connected to wire 164. Wire 164 connects with the other end of the shunt field winding 132 as well as with one end of a resistor 166, the other end of which is connected to ground. Wire 144 also connects with wire 168, wire 168 connecting with a leaf spring parking contact 170. Leaf spring contact 170 is engageable with a leaf spring contact 172 which is connected to a wire 174, the wire 174 connecting with the other end of the series field winding 130. The contacts 170 and 172 can be moved out of engagement by a cam 176 which engages a follower 178 attached to the leaf spring 170 when the wiper blades arrive at the depressed parked position against the cowl of the vehicle, as shown in Figure 1. During operation of the crank assembly in the running orbit, the cam 176 does not engage the follower 178, and accordingly, contacts 170 and 172 are maintained in engagement. Moreover, upon energization of the relay coil 148, the relay plunger 180 which is connected to the leaf spring 172 will move contact 172 into engagement with the contact 170 irrespective of the position of the cam 176.

The wire 144 is also connected to a wire 182, which connects with one end of coil 184 of the electromagnet 110. The other end of the coil 184 is connected to a wire 186 which connects with the fourth stationary contact 188 of the control switch 154. As shown diagrammatically in Figure 4, the bridging contact 160 engages a spring element 190 when it is moved so that it bridges contacts 188, 158 and 152. In other words, the bridging contact 160 must be held manually in an extreme position to bridge contacts 188, 158 and 152, and as soon as it is released, it returns to the low speed position to the left of the "off" position as seen in Figure 4.

With reference to Figures 5 through 9, a physical embodiment of the combined washer-wiper control switch 154 will be described. As seen in Figure 8, the switch 154 comprises a cylindrical housing 200 having a larger diameter contact housing portion 202 and a smaller diameter shaft supporting portion 204. A shaft 206 having a knob 208 is rotatably journalled in the portion 204 of the housing. The shaft 206 has shoulder 210 in engagement with a shoulder 212 of the housing, the shoulder 210 having an enlarged diameter arcuate portion 214 having ends 216 and 218 which cooperate with a suitable stop 220 formed integrally with the housing 200 so as to positively limit rotation of the shaft 206 to less than 180°.

As seen in Figure 6, the shaft 206 has an annular groove 222 separating flats 224 by which means the knob 208 is drivingly connected with the shaft. The shaft 207 also has a bifurcated portion indicated by numeral 226. A detent arm 228 is received within the bifurcated portion 226, the arm 228 having a pair of protruding buttons, or dimples, 230 and 232 engageable with sets of circumferentially spaced recesses 234 and 236, respectively, formed in the housing 200. A coil spring 238 is placed on top of the detent arm 228, the other end of the coil spring seating in a depressed, or yoke portion, 240 of the bridging contact 160. Since portions of the bridging contact 160 are disposed within the bifurcated portion 226 of the shaft, rotation of the shaft 206 will impart rotation to the detent arm 228 and the bridging contact 160, and these parts are always held in alignment with each other.

The upper end of the housing 200 is closed by an insulating plate 242 having a plurality of circumferentially spaced notches 244 which receive upstanding ears 246 formed on the housing 244, whereby the ears 246 can be bent over the plate 242 so as to retain the plate in assembled relation with the housing and properly locate the same in such assembled relation. The plate 242 carries arcuate stationary contacts 152, 156, 158 and 188. The contact 152 has a terminal portion 153; the contact 158 has a terminal portion 159, and the contact 188 has a terminal portion 189. In addition, the contact 188 has an inwardly extending flange portion 192.

When the bridging contact 160 is in the "off" position as indicated in Figure 7, the left hand contact 160a does not engage the fixed contact 152 due to the cutout portion 152a. However, the contact button 160b does engage the contact 158. Referring again to Figure 4, when the bridging contact 160 is in the "off" position, the relay coil 148 is deenergized as is the electromagnetic winding 184. The motor 16 is likewise deenergized since the blades 24 are in the depressed parked position and the cam 176 has opened the parking switch comprising contacts 170 and 172.

To initiate operation of the wiper unit alone, the knob 208 as seen in Figure 8 is turned in a clockwise direction, or counterclockwise as seen in Figure 7, to either the low, medium or high speed positions. With reference to Figure 4, upon movement of the bridging contact 160 to the low speed position, the relay coil 148 will be energized from the battery 142, through overload switch 146, wire 144, coil 148, wire 150, contact 152 and contact 160 which is connected to ground. The cooperable buttons 230 and 232 on the detent arm 228 and recesses 234 and 236 determine the low, medium and high speed positions for operating the wiper unit alone as well as the off, low and wash positions to be described. Upon energization of the relay coil 148, the plunger 180 moves contact 172 into engagement with contact 70 so as to energize the motor 16 from the battery through overload switch 146, wires 144 and 168, contacts 170 and 172, wire 174, series field winding 130 and the armature 136. In the low speed position the shunt field winding 132 is connected directly to ground through wire 164, contacts 124 and 126, wire 162, contact 158 and contact 160. When the movable bridging contact 160 is moved to the medium speed position, resistor 161, of twenty ohms, is connected in series with the shunt field winding 132 so as to reduce the energization thereof. When the movable bridging contact 160 is moved to the high speed position, resistor 166, of for example, 60 ohms is connected in series with the shunt field winding 132 so as to further reduce the energization thereof.

When the movable bridging contact 160 is moved from any of the running positions to the "off" position, the relay coil 148 is deenergized. However, switch contacts 170 and 172 remain in engagement until the crank assembly 18 goes into its parking orbit, the motor being energized for low speed operation since the shunt field winding 132 is connected directly to ground through wire 164, contacts 124 and 126, wire 162, contact 158 and bridging contact 160. When the wiper blades arrive at the depressed parked position, as shown in Figure 1, cam 176 will actuate the follower 178 to separate the contacts 170 and 172 to deenergize the motor 16.

In order to initiate conjoint operation of the wiper unit and the washer unit, the knob 208 is moved in a counterclockwise direction, as viewed in Figure 8, or clockwise as viewed in Figure 7, to the wash position. As seen in Figure 9, in the wash position the detent buttons 230 and 232 are partially forced out of their complementary depressions 234 and 236 thereby compressing spring 238. The spring 238 is shown diagrammatically in Figure 4, it being pointed out that the function of the spring is also to restore the bridging contact 160 to the low speed position upon release of the knob and disengage it from contact 188. When the bridging contact 160 is moved to the wash position, it not only bridges contacts 152 and 156, but also engages the end 192 of contact 188. Since the bridging contact 160 is connected to ground, when it engages stationary contact 188, the washer electromagnet 110 will be energized from the battery through wire 142, overload switch 146, wire 182, coil 184, wire 186, and contacts 188 and 160. At the same time, the bridging contact 160 engages contacts 152 and 158, and thus the relay coil 148 will be energized.

Accordingly, the motor 16 will be energized and will rotate while the armature 114 is attracted by the electromagnet 110. When the armature 114 is attracted by the electromagnet 110, reciprocation of the drive pawl 102 will be effective to impart step by step movement to the ratchet cam 76 due to the follower 94 being reciprocated by the cam on the worm gear, not shown, reciprocation of the follower effecting swinging movement of the lever 96 and reciprocation of the drive pawl 102. As aforementioned, the electromagnet 110 need only be momentarily energized, since as soon as the ratchet cam 76 moves through the distance of one tooth, the follower 120 on the armature 114 rides on the cylindrical surface 84 so that the driving connection between the pawl 102 and the ratchet cam continues for an entire revolution of the ratchet cam. Moreover, as soon as the ratchet cam moves through the distance of one tooth, the follower 122 engages the face cam 88 whereupon contact 124 will no longer engage contact 126 so that the shunt field 132 will be energized through resistor 166, and thus, the motor 16 will operate at high speed irrespective of the fact that the bridging contact 160 is automatically returned to the low speed position to the left of the "off" position in Figure 4, and clockwise of the "off" position in Figure 7, when the knob is released so that the detent buttons 230 and 232 again seat in their respective depressions 234 and 236.

During the first half revolution of the ratchet cam assembly 76 liquid solvent will be intermittently squirted onto the windshield by the washer pump. Moreover, since the pump rod 62 is actuated directly by the worm gear which rotates the crank assembly 18, liquid solvent will be discharged onto the windshield for a predetermined number of wiper unit strokes. When the lug 90 reengages the lock-out cam 82, the washer unit will be automatically arrested, and the follower 122 will be disengaged from the face cam 88. Thus, switch contact 124 will again engage switch contact 126 to short circuit resistor 166 and thus increase the energization of the shunt field winding 132 so as to effect motor rotation at low speed. The ratchet cam will continue to be driven by the pawl 102 until it has made a complete revolution. The motor 16 will continue to be energized, and thus the wiper unit will be operative until the driver turns the knob 208 in the clockwise direction as viewed in Figure 8, or counterclockwise as viewed in Figure 7, to the "off" position. Thus, the driver has complete control of the length of time the wiper unit is operative after automatic washing, and when the driver determines that the windshield is dry and liquid solvent will not run down to streak the windshield, the switch 154 can be moved to the "off" position.

From the foregoing, it is apparent that the present invention provides an unique windshield cleaning system wherein the washer unit can be operated conjointly with the wiper unit, and when the washer unit control is actuated the washer unit will discharge liquid solvent for a predetermined number of wiper strokes, and then be automatically arrested. However, the wiper unit will continue to operate to dry the windshield until the driver moves the combined washer-wiper control switch to the "off" position.

While the embodiment of the invention as herein disclosed constitutes a preferred form, it is to be understood that other forms might be adopted.

What is claimed is as follows:

1. A windshield cleaning system including, a wiper unit, a washer unit, manually operable control means to set both units in operation for conjoint operation, and wiper unit stroke counting means for continuing operation of the washer unit throughout a predetermined number of strokes of said wiper unit and then automatically arresting the washer unit, said wiper unit continuing in operation until the manually operable control means is moved to the "off" position, said manually operable control means being capable of terminating operation of the washer unit and the wiper unit during said conjoint operation upon movement to the "off" position.

2. Windshield cleaning apparatus including, a washer unit having an operative cycle of definite duration including a pump having a control, a wiper unit including a motor having a control, first and second manually operable means for operating said motor control to activate said wiper unit, a wiper unit stroke counting means connected to the washer unit to automatically arrest the pump after a predetermined number of strokes of said wiper unit, said stroke counting means being set in operation by the pump control and said wiper unit continuing in operation until the motor control is moved to the "off" position.

3. A windshield cleaning system including, a washer unit, a wiper unit, first manually operable means for effecting independent operation of said wiper unit, second manually operable control means for effecting conjoint operation of the washer unit and the wiper unit, and wiper unit stroke counting means to continue operation of said washer unit for a predetermined number of strokes of said wiper unit and then automatically arrest said washer unit, said wiper unit continuing in operation until the manually operable control means is moved to the "off" position.

4. A windshield cleaning system including, a wiper unit, a washer unit, a single motor for operating both units, said motor having a continuous driving connection with said wiper unit and an interruptible driving connection with said washer unit, first manually operable means to activate said motor and set both units in operation for conjoint operation by establishing the driving connection between said motor and said washer unit, counting means for continuing operation of the washer unit through a predetermined number of strokes of said wiper unit and then automatically interrupting the driving connection between said washer unit and said motor to arrest said washer unit, said wiper unit continuing in operation until the manually operable control means is moved to the "off" position, and second manually operable control means for effecting independent operation of the wiper unit.

5. Windshield cleaning apparatus including, a washer unit having an operating cycle of definite duration including a pump having a control, a wiper unit including a motor having a control, first and second manually operable means for operating said motor control to activate said wiper unit, an interruptible driving connection between said motor and said pump, a wiper unit stroke control connected to the washer unit to automatically interrupt the driving connection between said motor and said pump after a predetermined number of strokes of said wiper unit during conjoint operation of said wiper unit and said washer unit, said stroke control being set in operation by the pump control and said wiper unit continuing in operation until the motor control is moved to the "off" position.

6. A windshield cleaning system including, a washer unit, a wiper unit, a single motor for actuating both units and having continuous driving connection with said wiper unit and an interruptible driving connection with said washer unit, first manually operable control means for effecting conjoint operation of the washer unit and the wiper unit by activating said motor and establishing driving connection between the motor and the washer unit, means to continue operation of said washer unit for a predetermined number of strokes of said wiper unit, said wiper unit continuing in operation until the manually operable control means is moved to the "off" position, and second manually operable control means for effecting independent operation of the wiper unit.

7. A windshield cleaning system including, a wiper unit, a washer unit, first manually operable control means to set both units in operation for conjoint operation, counting means for continuing operation of the washer unit throughout a predetermined number of strokes of said wiper unit and then automatically arresting the washer unit, said wiper unit continuing in operation until said manually operable control means is moved to the "off" position, and a second manually operable control means for effecting independent operation of said wiper unit.

8. A windshield cleaning system including, a wiper unit, a washer unit including a pump, a single motor for effecting operation of the wiper unit and the washer pump, means to effect wiper unit operation independently of actuation of the washer pump, and means to effect conjoint operation of the washer pump and the wiper unit with the operation of the washer pump being predetermined and automatically arrested while operation of the wiper unit is manually determined at all times.

9. Windshield cleaning apparatus including, a solvent reservoir, a power driven pump connectible to the reservoir and operable to deliver solvent onto the windshield for a predetermined number of wiper strokes, a power driven wiper unit operable to wipe the windshield, and unitary control means for the wiper unit and the pump movable from an "off" position whereby movement of said wiper unit control to one side of the "off" position effects operation of said wiper unit independently of said pump, and movement of said wiper unit control in the other direction from the "off" position effects conjoint operation of said wiper unit and said pump with the pump being operated for said predetermined number of wiper strokes while the wiper unit continues to operate until the wiper unit control is returned to the "off" position.

10. A windshield cleaning system including, a wiper unit, a washer unit having a pump, an electric motor having a continuous driving connection with said wiper unit and an interruptible driving connection with said pump, a first circuit for energizing said motor to effect wiper unit operation independently of said washer unit, and a second circuit for energizing said motor including means for establishing the driving connection between said motor and said pump to as to effect conjoint operation of said wiper unit and said washer unit, said washer unit operating for a predetermined number of wiper unit strokes and then being automatically arrested, said wiper unit continuing to operate due to energization of said motor until said second circuit is manually opened.

11. The cleaning system set forth in claim 10 wherein said second circuit includes speed control means for said motor whereby the motor will operate at high speed during operation of said washer unit.

12. A windshield cleaning system including, a wiper unit, a washer unit having a pump, an electric motor having a continuous driving connection with said wiper unit and an interruptible driving connection with said pump, a first circuit for energizing said motor and effecting operation of said wiper unit independent of operation of said washer unit, and a second circuit for energizing said motor including an electromagnet for establishing the driving connection between said motor and said pump to effect conjoint operation of the wiper unit and the washer unit, said washer unit continuing to operate for a predetermined number of wiper unit strokes and then being automatically arrested, said wiper unit continuing to operate due to motor energization until said second circuit is manually opened.

13. The cleaning system set forth in claim 12 wherein said first and second circuits are controlled by a switch having an actuator movable in both directions from an "off" position.

14. The cleaning system set forth in claim 13 wherein said switch assembly includes a movable contact and a plurality of stationary contacts, and wherein movement of said movable switch contact in one direction simultaneously energizes said motor and said electromagnet whereas movement of said movable switch contact in the other direction energizes only the motor.

15. The windshield cleaning assembly set forth in claim 13 wherein said switch assembly includes detent mechanism for locating the "off" and "on" positions of said switch assembly, and wherein movement of said actuator in one direction from the "off" position past the "on" position energizes said electromagnet and said motor, and upon release of the actuator the switch assembly automatically moves to said "on" position in said one direction.

16. A windshield cleaning system including, a wiper unit, a washer unit, means to effect wiper unit operation independently of actuation of the washer unit, and single manipulative means to effect conjoint operation of the washer unit and the wiper unit with the operation of the washer unit being predetermined and automatically arrested while operation of the wiper unit is manually determined.

17. A windshield cleaning system including, a wiper unit, a washer unit, and single manipulative means to effect conjoint operation of the washer unit and the wiper unit with the operation of the washer unit being predetermined and automatically arrested while operation of the wiper unit is manually determined.

18. A windshield cleaning system including, a washer unit having a separate cycle of definite duration including a pump having a control, a wiper unit having a control, and single manipulative means to actuate both controls to effect conjoint operation of the washer unit and the wiper unit with the washer unit being automatically arrested after operating through said cycle of definite duration while operation of said wiper unit continues until the wiper unit control is moved to the "off" position.

19. A windshield cleaning system including, a washer unit having a separate cycle of definite duration including a pump having a control, a wiper unit having a control, first means to actuate the wiper unit control to effect independent operation of the wiper unit, and second single manipulative means to actuate both controls to effect conjoint operation of the washer unit and the wiper unit with the washer unit being automatically arrested after operating through said cycle of definite duration while operation of the said wiper unit continues until the wiper unit control is moved to the "off" position.

References Cited in the file of this patent

UNITED STATES PATENTS

| | | |
|---|---|---|
| 1,753,621 | Norviel et al. | Apr. 8, 1930 |
| 2,121,671 | Schwarze | June 21, 1938 |
| 2,162,985 | West | June 30, 1939 |
| 2,206,814 | Horton | July 2, 1940 |
| 2,816,316 | Oishei | Dec. 17, 1957 |
| 2,878,505 | Ziegler | Mar. 24, 1959 |